United States Patent [19]

Machin et al.

[11] Patent Number: 6,038,544
[45] Date of Patent: Mar. 14, 2000

[54] SYSTEM AND METHOD FOR DETERMINING THE PERFORMANCE OF A USER RESPONDING TO A CALL

[75] Inventors: David R. Machin, Lafayette, Ind.; Jon Anton, Santa Maria, Calif.

[73] Assignee: Teknekron Infoswitch Corporation, Fort Worth, Tex.

[21] Appl. No.: 09/031,354

[22] Filed: Feb. 26, 1998

[51] Int. Cl.[7] .............................. G09B 7/00; H04M 1/64
[52] U.S. Cl. ................................ 705/11; 705/11; 705/38; 379/88; 379/265; 379/266; 379/309; 379/93; 379/102; 434/169; 434/336; 434/350; 235/56; 235/386
[58] Field of Search ................................... 705/11, 38, 35; 379/88, 93, 102, 265, 266, 309; 434/366, 169, 350; 235/56, 386

[56] References Cited

U.S. PATENT DOCUMENTS

| | | | |
|---|---|---|---|
| 4,764,120 | 8/1988 | Griffin et al. | 705/11 |
| 5,117,353 | 5/1992 | Stipanovich et al. | 374/401 |
| 5,164,897 | 11/1992 | Clark et al. | 364/401 |
| 5,164,981 | 11/1992 | Mitchell et al. | 479/88 |
| 5,444,774 | 8/1995 | Friedes | 379/266 |
| 5,458,494 | 10/1995 | Krohn et al. | 705/11 |
| 5,500,795 | 3/1996 | Powers et al. | 705/35 |
| 5,671,409 | 9/1997 | Fatseas et al. | 395/615 |
| 5,742,675 | 4/1998 | Kilander et al. | 379/265 |
| 5,797,133 | 8/1998 | Jones et al. | 705/38 |
| 5,867,562 | 2/1999 | Scherer | 379/88 |
| 5,870,721 | 2/1999 | Norris | 705/38 |

OTHER PUBLICATIONS

Garry Ray, "Testing 1–2–3 Skills," *Lotus*, Apr. 1992, pp. 34–36.

*Primary Examiner*—James P. Trammell
*Assistant Examiner*—Nga B. Nguyen
*Attorney, Agent, or Firm*—Baker Botts L.L.P.

[57] ABSTRACT

A system for determining the performance of a user responding to a call includes a processor, a memory, and an interface. The system presents stored audible and textual information to a user to simulate a call, and generates scores to determine the performance of the user in responding to the calls.

31 Claims, 4 Drawing Sheets

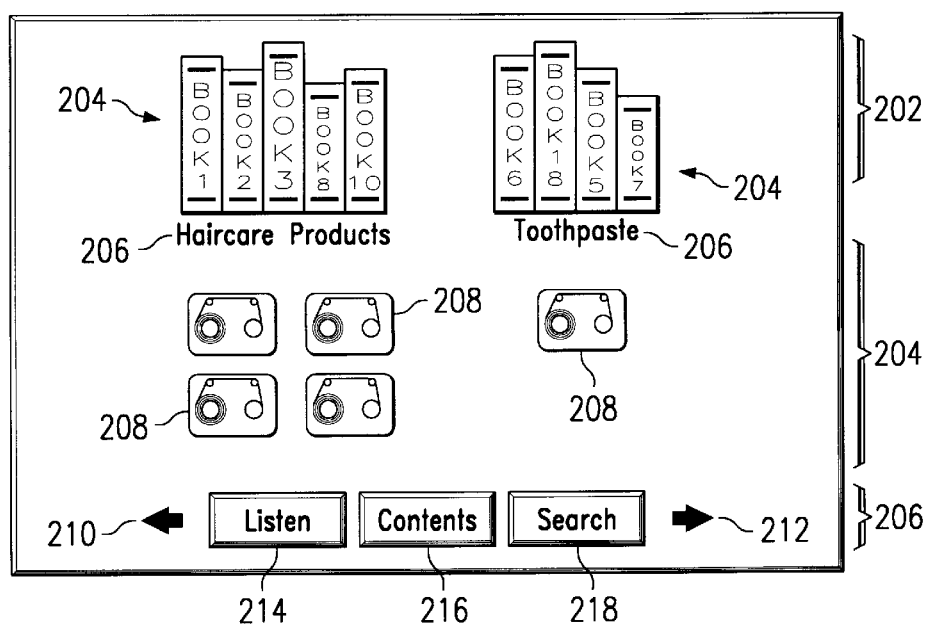

SYSTEM AND METHOD FOR DETERMINING THE PERFORMANCE OF A USER RESPONDING TO A CALL

TECHNICAL FIELD OF THE INVENTION

This invention relates generally to the field of telecommunications, and more specifically to a system and method for determining the performance of a user responding to a call.

BACKGROUND OF THE INVENTION

Telecommunication systems are ubiquitous in our society. The development of new technologies and investment in new infrastructure has increased the connectivity and availability of telephone service. Companies realize the important role that telephone service plays in contacting, developing, and servicing their clients.

One common business approach to providing a variety of services to customers uses a call center staffed by a number of call center agents to handle incoming customer calls. The call center agent must then respond to the incoming call courteously and efficiently to satisfy the customer's need. Some call center agents respond more effectively to customer calls due to a variety of important job skills.

Traditionally, the screening of job applicants for call center agent positions includes a written application and perhaps a personal interview. This screening process may not properly measure those job skills to become an effective call center agent. Moreover, traditional screening processes do not offer a realistic job preview, and many are more expensive and time consuming alternatives that do not effectively screen out effective call center agents.

SUMMARY OF THE INVENTION

In accordance with the present invention, a system and method for determining the performance of a user responding to a call is provided that substantially eliminates or reduces disadvantages or problems associated with previously developed systems and methods. In particular, the present invention determines the performance of a user based on responses to prerecorded incoming voice segments associated with a call.

In one embodiment of the present invention, a system for determining the performance of a user responding to a call includes a memory that stores a number of prerecorded incoming voice segments associated with the call. A speaker communicates the incoming voice segments to the user, and an interface receives user input as the user responds to the incoming voice segments. A processor selects the incoming voice segments to communicate by the speaker and determines the performance of the user based on the user input.

Technical advantages of the present invention include a system and method that determine the performance of a user responding to a call by presenting prerecorded incoming voice segments associated with the call to the user. The user then interacts with an interface to respond to the incoming voice segments by generating user input. The user input may be a selection of an appropriate response to the incoming voice segment and/or the entering of information regarding the customer or the reason for the call. The present invention then determines the performance of the user based on the user input. In this manner, the present invention provides a realistic job preview that can both assess critical job skills and expose the applicant to a realistic job preview.

Other technical advantages of the present invention include the ability to script a call by relating prerecorded incoming voice segments to corresponding responses in textual and/or audible form. A chosen response then triggers an additional prerecorded incoming voice segment associated with the response. In a particular embodiment, the invention may be implemented in a stand-alone computer or workstation that also includes multimedia presentations of the employer's business, an on-line application process, a help facility, and other information and capabilities that allow effective and efficient screening of job applicants for call center agent positions. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 3 illustrates a listen screen for interacting with the user of the system;

FIG. 4 illustrates a reference screen for interacting with the user of the system;

DETAILED DESCRIPTION OF THE INVENTION

Figure 1:
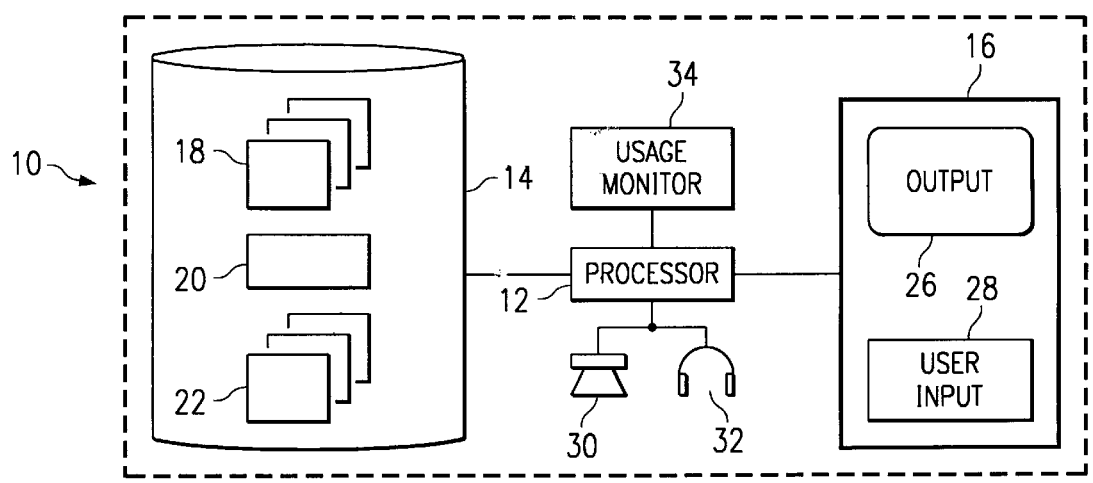
FIG. 1 illustrates a system for determining the performance of a user responding to a call.

FIG. 1 illustrates a system 10 for determining the performance of a user responding to a prerecorded call. Generally, system 10 presents stored audible and textual information to a user to simulate the call. In a particular embodiment, system 10 evaluates the performance of call center agents or applicants in handling a variety of prerecorded incoming calls. System 10 may also be used to simulate outgoing calls.

System 10 includes a processor 12 coupled to a memory 14 and an interface 16. Memory 14 comprises random access memory (RAM), read-only memory (ROM), CD-ROM, removable or fixed magnetic or optical storage media, or any other suitable volatile or non-volatile memory. Memory 14 stores a number of prerecorded or simulated calls 18. Each call 18 contains an arranged series of prerecorded voice segments and associated responses in audible and/or textual form to simulate an interactive voice conversation between the user of system 10 and a third party. Memory 14 also stores program instructions 20 executed by processor 12 to control the overall operation of system 10. User profiles 22 stored in memory 14 include user supplied information, such as name, address, job applicant information or any other suitable information. Profiles 22 may also include the number and type of calls 18 handled by the user and a variety of performance measures based on how the user responds to calls 18.

Interface 16 includes an output module 26, such as a display, that presents both textual information and graphical images. Output module 26 may be in the form of a graphical user interface (GUI) that presents several interactive screens, multimedia presentations, and other information during the operation of system 10. Specifically, output module 26 presents a listen screen (FIG. 3), a reference screen (FIG. 4), and a score screen (FIG. 5) during operation of system 10. Interface 16 also includes a user input module 28 that comprises a keyboard, mouse, microphone, or other device that allows the user to input information into system 10.

System 10 also includes a speaker 30, headset 32, or other audible output device that communicates prerecorded voice segments contained in call 18 stored in memory 14. Speaker 30 and headset 32 may be considered part of interface 16. System 10 also includes a usage monitor 34 that tracks the number of tests or sessions performed by system 10. Usage monitor 34 may include a key counter, password, or other mechanism to limit and monitor the number of tests based on the amount of licensing fees or other compensation paid for system 10. For example, a company, such as a call center provider, may purchase or license the use of system 10 at a fixed fee for an unlimited number of tests, or may purchase or license system 10 at a set price for a certain number of tests (e.g., $15.00 per test). Usage monitor 34 tracks the number of tests performed by system 10, disables use of system 10 beyond the allotted number of tests, and re-authorizes system 10 upon payment of a fee for additional tests.

In a particular embodiment, system 10 operates on a stand-alone computer or workstation that comprises an integrated job applicant screening simulator. The computer may execute with any of the well known MS-DOS, PC-DOS, OS-2, MAC-OS, WINDOWS™, UNIX, or other appropriate operating systems. The interactive screens, GUI, scripting of calls 18, and the storage, retrieval, and arrangement of sound files may be accomplished using any suitable multimedia authoring tool, such as AUTHORWARE by MACROMEDIA. It should be understood that the inventive concepts of system 10 may be implemented using any appropriate hardware, software, authoring tools, data files, or other arrangements of data.

In operation, system 10 performs a test of a user by presenting one or more calls 18. Processor 12 retrieves a selected call 18 and communicates corresponding prerecorded voice segments to the user using speaker 30 or headset 32. During audible communication of the prerecorded voice segments, output module 26 of interface 16 presents a listen screen that offers a selection of possible responses and fields for other user entry.

Using user input module 28, the user selects an appropriate response, enters caller information, enters comments or notes concerning call 18, or provides other information to respond to call 18. To make a selection of possible responses, the user may request that responses be audibly communicated through speaker 30 or headset 32 to assess the tone, quality, emphasis, accent, empathy, and other non-textual information conveyed in the responses. User input module 28 then passes the response selections and other user entry received from the user to processor 12. Processor 12 then selects the next prerecorded voice segment for presentation to the user, and determines the performance of the user in a number of different categories based on the user input. Processor 12 stores scores for the user in user profile 22.

Upon handling a particular call 18, system 10 may select another call 18 for presentation to the user. The entire user session may include the processing of a number of calls 18 to present a realistic job preview to the user. In a particular embodiment, the user is a call center agent or an applicant for a call center agent position, and system 10 determines the performance of the user in responding to the variety and type of incoming calls expected in the call center. For example, incoming calls 18 may present problems, questions, complaints, requests, or other situations typically received at the call center. System 10 then generates scores for the user in a variety of categories on a variety of different call situations, and compares these scores to established baselines or other hiring criteria for call center agents. System 10 may also generate an overall score that provides a quantitative assessment of the performance of the user in handling incoming calls. An organization can use system 10 to screen call center agent applicants, train and re-train existing agents, or evaluate the performance of agents or applicants for any suitable reason.

Figure 2:
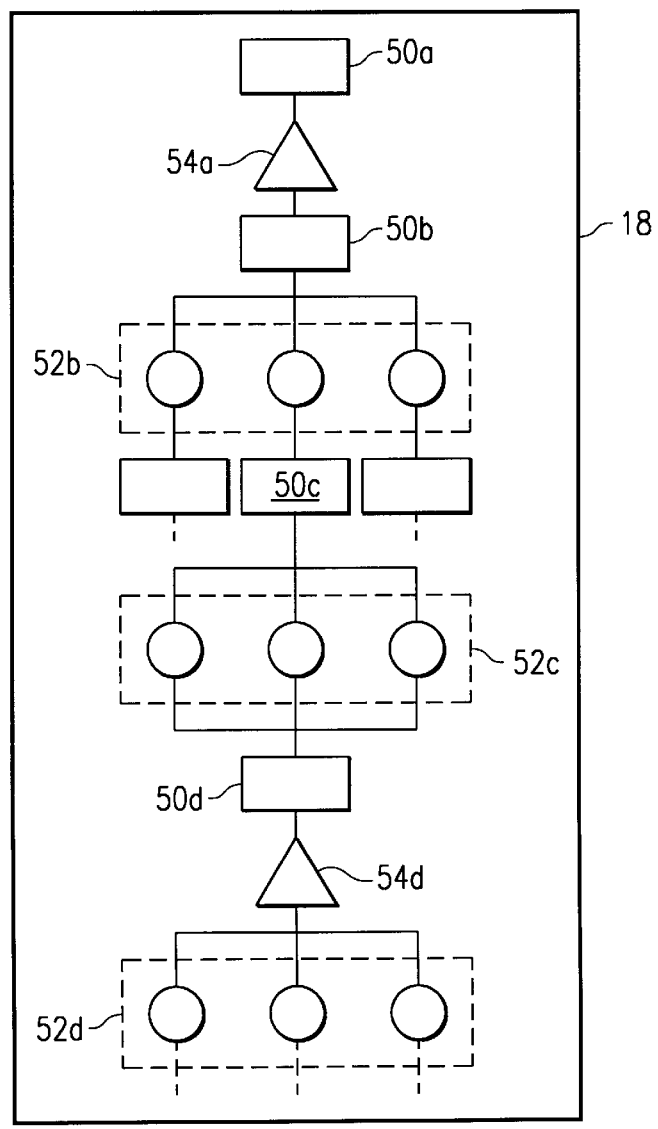
FIG. 2 illustrates a schematic diagram of a call that includes prerecorded incoming voice segments.

FIG. 2 illustrates call 18 that includes an arrangement of prerecorded voice segments 50, possible responses 52, and user entry periods 54. In general, call 18 stored in memory 14 provides a framework and associated audible and textual information for simulating an interactive call between the user and a third party.

Each voice segment 50 comprises a digitized sound file stored in any suitable format in memory 14, and an identification or association with other portions of call 18. Also, each voice segment 50 may have associated data that stores the text of voice segment 50. Responses 52 represent possible responses to voice segments 50 that the user can select. Memory 14 stores responses 52 as text and presents responses 52 on output module 26 to the user. In addition, memory 14 may store a version of responses 52 as digitized sound files, so that the user can listen to the response to assess non-textual information in order to make a proper selection. For example, the tone of voice, emphasis of words, or other intonations in responses 52 may be important in making the proper selection. In a particular embodiment, two selected responses 52 may include the same textual content, but differ in the non-textual information conveyed. In such a case, response 52 that conveys more empathy, understanding, confidence, or other desirable attribute would be the most appropriate choice for the user.

User entry periods 54 may be placed anywhere throughout call 18 to indicate a point in the call sequence in which the user is expected to enter information regarding the caller or the reasons for the call. For example, user entry period 54 may represent a place in the call sequence where the user enters information conveyed in voice segment 50. Similarly, user entry period 54 may represent a time during a call sequence in which the user is expected to input (e.g., type) a written report on the content or subject matter of call 18. It should be appreciated that user entry periods 54 may be placed at any step in the call sequence, and may or may not be followed by possible responses 52 for the user to select.

Call 18 schematically represented in FIG. 2 depicts a sequence of voice segments 50, responses 52, and user entry periods 54. System 10 may implement or maintain this logical sequence using appropriate flags, identifiers, or other association information that relates specific segments 50, responses 52, and user entry periods 54. Therefore, the logical association and arrangement for each call 18 may be accomplished through any suitable index, link list, identifiers, associators, or other suitable information stored in memory 14.

The specific content of call 18 illustrates a number of component relationships. For example, voice segment 50a may audibly convey caller information that the user enters, as represented by user entry period 54a. The next voice segment 50b then presents to the user a problem, question, complaint, request, or other reason for the incoming call. In response, interface 16 presents three possible responses 52*b* to the user. Interface 16 presents the textual content of responses 52*b* to the user, and may also allow the user to hear responses 52*b* to assess non-textual content. Each response 52*b* is associated with another voice segment.

Selection of the second of responses 52*b* then triggers system 10 to play associated voice segment 50*c*. This dependency between chosen responses 52 and subsequently played voice segments 50 allows system 10 to adjust dynamically the phone conversation represented by call 18 in response to user interaction. This conditional call sequence branching provides a richer and more realistic call simulation environment.

Upon audibly communicating voice segment 50*c* to the user, interface 16 presents responses 52*c* for selection. In this case, selection of any of responses 52*c* will result in the playing of the same voice segment 50*d*. After selecting a response 52*c* and hearing voice segment 50*d*, the user enters information regarding the caller or the reasons for the call, as illustrated by user entry period 54*d*. Next, the user selects from responses 52*d*. Call 18 continues until the simulation of the incoming call is complete. It should be understood that system 10 contemplates calls 18 that contain any logical arrangement or sequencing of elements to depict an incoming or outgoing call sequence. An increase in conditional sequencing typically increases the realistic nature of the simulated call.

FIG. 3 illustrates a listen screen 100 presented by output module 26 of interface 16 during simulation of call 18 by system 10. Listen screen 100 includes caller information fields 102, note fields 104, response fields 106, and control buttons 108. Caller information fields 102 comprise areas where the user can enter information conveyed in voice segments 50 regarding the caller. This information may include the name, address, social security number, phone number, or any other information identifying or related to the caller. Similarly, note fields 104 allow the user to enter notes, reports, and other information regarding the reason for call 18. Caller information fields 102 and note fields 104 in listen screen 100 may be expanded to include any suitable areas that allow the user to enter textual information audibly conveyed in voice segments 50. System 10 scores the user based on the accuracy and speed of information entered in fields 102 and 104.

Response fields 106 present the textual content of responses 52 associated with each communicated voice segment 50. The user can select the most appropriate response by typing keys on a keyboard (e.g., 1, 2, or 3), by pointing and clicking with a mouse or other suitable pointing device, or using any other suitable technique. In the illustrated example, the first response states "Sir, there are 220 calories in each bowl of cereal;" the second response states "Sir, there are 120 calories in each bowl of cereal;" and the third response states "I'm sorry sir, I can't find that information." Each response 52 in response fields 106 corresponds to a score or credit to the user for selection. For example, the first response with the correct factual information (220 calories) produces a higher score, whereas the second response (incorrect information) or the third response (no information) produce a lower score.

Control buttons 108 include a please repeat button 110, a hear responses button 112, a reference button 114, and a new call button 116. When activated, please repeat button 110 causes system 10 to repeat voice segment 50. Continued use of please repeat button 110 lowers the user's score. When activated, hear responses button 112 allows the user to hear responses 52 shown in response fields 106 as conveyed audibly by speaker 30 or headset 32. This allows the user to assess the non-textual significance of each response. In a particular embodiment, text of two responses 52 may be exactly the same, but the tone, intonation, and other non-textual content of responses 52 differ. Therefore, system 10 tests whether the user can recognize the proper tone and manner of responses 52.

When activated, reference button 114 displays reference screen (FIG. 4), which allows the user to find information requested by the caller or otherwise used in responding to call 18. In a typical situation, the user may be presented with voice segment 50 requesting specific factual information on a product. In response, the user activates reference button 114 to temporarily navigate through a reference screen to find the requested information. The user may then return to listen screen 100 and provide the proper selection based on the information found in the reference screen.

When activated, new call button 116 indicates that the user is now ready for another call. This allows system 10 to determine how quickly the user can handle the first call, enter appropriate information in fields 102 and/or 104, and be ready for the next call. The interval, timing, and consistency of activations of new call button 116 may impact the user's scores.

FIG. 4 illustrates reference screen 200 that allows the user of system 10 to find information to handle call 18. Reference screen 200 includes a book library 202, a video library 204, and control buttons 206 arranged as graphical elements. Book library 202 graphically illustrates books 204 arranged by subject or title 206. Similarly, video library 204 includes graphical representations of videos 208, also arranged by subjects 206. When the user clicks on book 204, reference screen 200 displays an index associated with book 204. The user may then click on an entry in the index to display a fact which may be, for example, the answer to a caller's question. When the user clicks on video 208, reference screen 200 plays a video segment which contains facts that allow the user to respond to call 18.

Control buttons 206 include a left scroll button 210, a right scroll button 212, a listen button 214, a contents button 216, and a search button 218. Scroll buttons 210 and 212 allow the user to navigate through the graphical representations of books 204 and videos 208. When activated, listen button 214 causes output module 26 to display listen screen 100. When activated, contents button 216 causes reference screen 200 to display a table of contents or a listing of subjects 206 contained in books 204 and videos 208. When activated, search button 218 causes reference screen 200 to present a searching facility that allows text-based searching of books 204, subjects 206, and textual content or descriptions of videos 208. Although reference screen 200 includes specific graphical representations and functionality, system 10 contemplates any arrangement, presentation, or selection of information in textual or graphical form that allows the user to respond to a problem, question, complaint, request, or other need presented during call 18.

Figure 5:
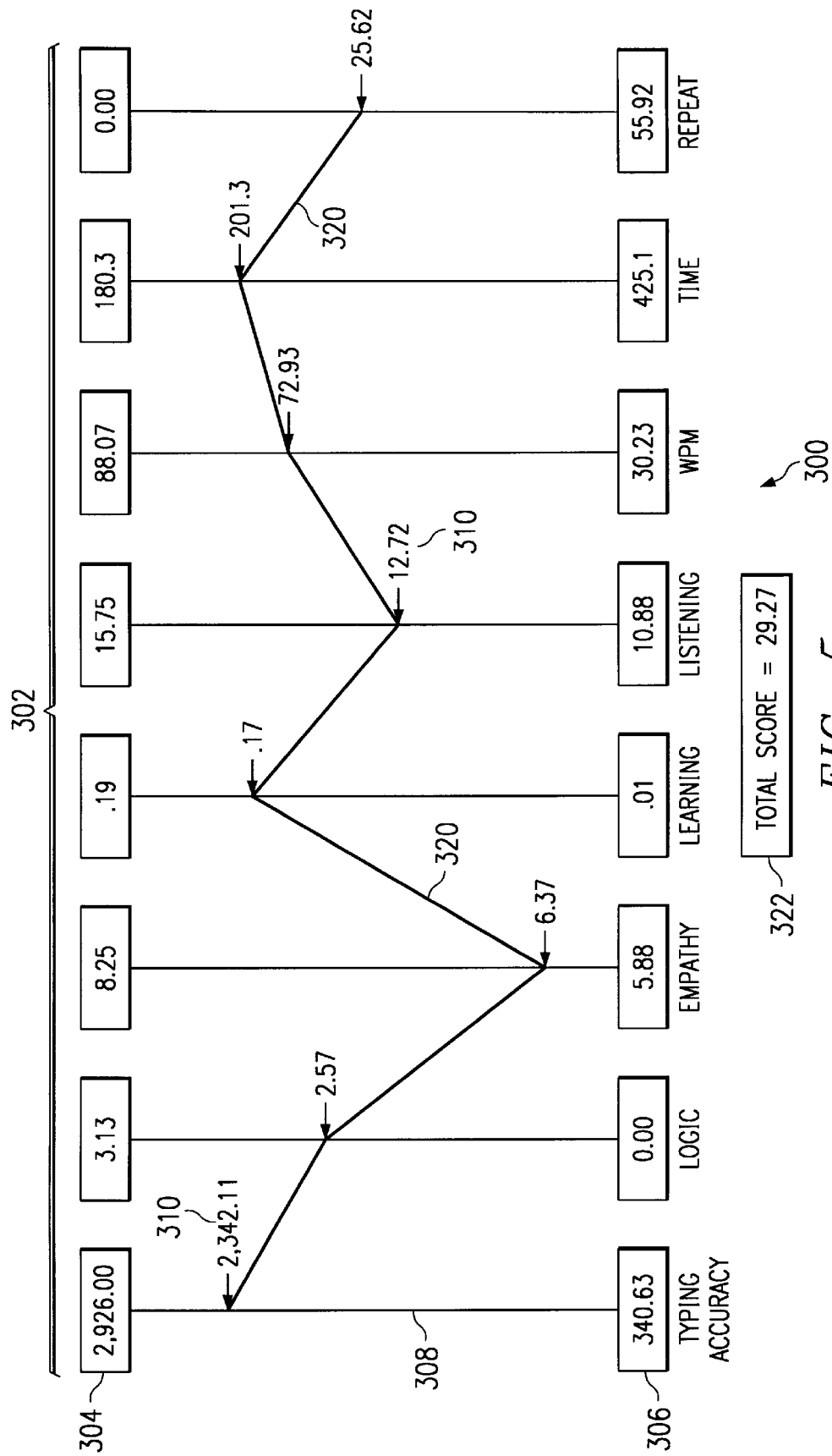
FIG. 5 illustrates a score screen for graphically illustrating scores of users on the system.

FIG. 5 illustrates a score screen 300 that graphically displays the performance of the user in a variety of categories. Score screen 300 represents each category 302 using an upper baseline 304, a lower baseline 306, a vertical line 308 between baselines 304 and 306, and a score 310 in the associated category. In a particular embodiment, baselines 304 and 306 comprise numerical values and score screen 300 presents score 310 on line 308 in accordance with its numeric value. Therefore, score screen 300 presents an immediate graphic representation of the user's scores in a variety of different categories.

Illustrative scoring categories shown in score screen 300 include typing accuracy, logic, empathy, learning, listening, words per minute (WPM), time, and repeat. Categories 302 illustrated in score screen 300 are merely exemplary. System 10 contemplates any other suitable category 302 to assess the performance of a user in responding to calls 18. Moreover, each category 302 may represent one or more calculations, variables, manipulations, or other processing to arrive at a meaningful numerical measure of performance.

As an example, the logic category measures and evaluates factors from calls 18 that present problems and questions. The empathy category measures how the user handled complaints, and also the user's recognition of the proper tone, demeanor, and other non-textual attributes of responses 52. System 10 determines the learning category score based on the user's responses that relied on information obtained from reference screen 200. The listening category assesses whether the user carefully listens to voice segments 50 and properly enters information in fields 102 and 104. The typing accuracy and WPM categories assess the user's accuracy and speed when entering information into fields 102 and 104. The time category indicates how quickly and efficiently the user can properly respond to and complete call 18. Finally, the repeat category determines whether the user requested system 10 to repeat voice segments 50.

System 10 sets baselines 304 and 306 using previous user scores, exemplary or predetermined minimum scores and exceptional scores, or other technique. For example, system 10 may set baselines 304 and 306 by testing current employees using, for example, generic call situations not specific to the company's operations. Upper baselines 304 may represent scores for the best user or the best score in each category for all users. Similarly, lower baseline 306 may represent scores for the worst user or the worst scores in each category among all users.

Score screen 300 may illustrate scores in categories for more than one user, and depict a graph 320 connecting scores for a single user to enhance the visual presentation. Also, score screen 300 may depict upper baseline 304 in one color (e.g., green) and lower baseline 306 in another color (e.g., red). In a green/red color configuration, individual category scores 310 may be colored green if close to upper baseline 304, red if close to lower baseline 306, and yellow if near the middle of line 308. Score screen 300 may also average, normalize, combine, or otherwise process numerical values in each of the categories to arrive at a total score 322.

Figure 6:
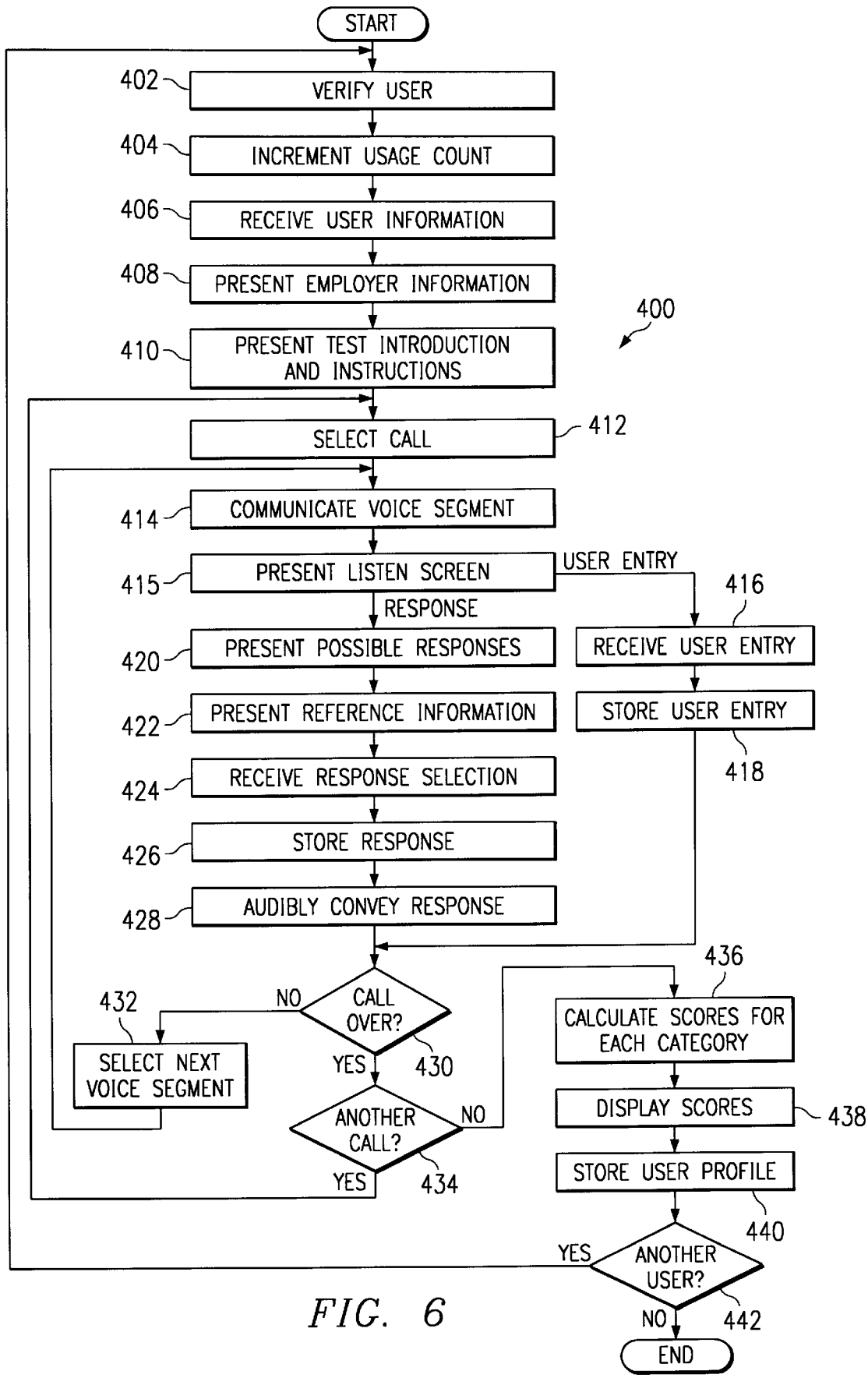
FIG. 6 is a flow chart of a method of operation of the system.

FIG. 6 is a flow chart of a method 400 of operation of system 10. The method begins at step 402 where system 10 verifies the user using a user identification, password, or other information. In a particular embodiment, system 10 is particularly adapted to the assessment of skills for call centers, and the user is an applicant for a call center agent position. Usage monitor 34 increments the usage count at step 404 to monitor the number of tests performed by system 10. System 10 receives user information using user input module 28 at step 406. This information may include the user's name, address, social security number, or any other information that is appropriate in the job application or testing process.

System 10 then presents employer information at step 408. This information may include an electronic company brochure, interactive web site, or other multimedia presentation that introduces the user to the prospective employer. This employer information may also include salary information, benefits, job responsibilities, and other information about the job. At step 410, system 10 presents an introduction to the test and supplies instructions on how the user responds to calls 18.

To begin the test, system 10 selects call 18 at step 412. System 10 may select call 18 based on a predetermined incoming or outgoing call sequence, the specific job applied for, information entered by the user in step 406, or on other criteria. System 10 then audibly communicates voice segment 50 associated with call 18 using speaker 30 or headset 32 at step 414, and presents listen screen 100 on output module 26 at step 415. At this time or during any other time when output module 26 presents listen screen 100, the user can activate please repeat button 110 to replay voice segment 50. Depending on the arrangement of components in call 18, system 10 receives user input as user entry, a response selection, or both from the user. For user entry, user input module 28 of interface 16 receives user entry at step 416. This may be a result of the user entering information into fields 102 and/or 104 of listen screen 100. System 10 then stores user entry at step 418 for later scoring.

To receive a selected response, system 10 presents possible responses 52 associated with voice segment 50 at step 420. Listen screen 100 displays the text of responses 52 in response fields 106 and, upon activation of hear responses button 112, system 10 may audibly convey one or all of the responses in sequence to the user using speaker 30 or headset 32. If responses 52 indicate a need for reference information, system 10 presents reference information using reference screen 200 in response to the user activating reference button 114 in listen screen 100 at step 422. System 10 then receives a selection of response 52 by the user at step 424 and stores the selection of response 52 at step 426 for later scoring. If memory 14 in system 10 stores voice segments associated with responses 52, system 10 may audibly convey the selected response 52 at step 428 using speaker 30 or headset 32.

If call 18 is not over, as determined at step 430, system 10 selects the next voice segment 50 at step 432. In a particular embodiment, system 10 conditions the selection of the next voice segment 52 on response 52 chosen by the user. In this manner, system 10 more accurately simulates a two-way conversation. Upon selecting the next voice segment 50 at step 432, system 10 then communicates the next voice segment 52 at step 414, receives user entry (steps 416 to 418), and/or receives user response selections (steps 420 to 428).

If call 18 is over, as determined at step 430, then system 10 determines whether to present another call to the user at step 434. If the testing scheduled for the user includes another call, system 10 selects the next call 18 at step 412 and proceeds with the simulation. If there is not another call as determined at step 434, system 10 retrieves stored user entry and response selections to calculate scores for each category at step 436. It should be understood that system 10 can calculate scores during or after simulation of one or more calls 18. System 10 may display scores to the user or reviewer on score screen 300 at step 438. System 10 stores user information entered at step 406 and scores determined at step 436 as user profile 22 in memory 14 at step 440. If there is another user on system 10, the process begins again at step 402 to verify the new user, otherwise method 400 ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for determining the performance of a user responding to a call, comprising:

a memory operable to store a plurality of prerecorded incoming voice segments that simulate an incoming call;

an interface operable to communicate the incoming voice segments to the user, the interface further operable to receive user input as the user responds to the incoming voice segments; and a processor coupled to the memory and the interface, the processor operable to select the incoming voice segments to communicate, the processor further operable to determine the performance of the user based on the user input.

2. The system of claim 1, wherein:

the memory stores a plurality of potential user responses associated with each incoming voice segment; and the interface receives user input specifying a selected response.

3. The system of claim 1, wherein:

the memory stores a plurality of potential user responses associated with each incoming voice segment;

the interface receives user input specifying a selected response; and the processor determines the performance of the user based on whether the selected response is the most appropriate.

4. The system of claim 2, wherein the memory stores a prerecorded voice segment that audibly conveys each response, the interface further operable to communicate the prerecorded voice segment to the user.

5. The system of claim 1, wherein:

the memory associates a plurality of potential user responses for a first incoming voice segment to a plurality of second incoming voice segments, each response associated with a corresponding second incoming voice segment;

the interface receives user input specifying a selected response; and the processor selects the second incoming voice segment associated with the selected response.

6. The system of claim 1, wherein the interface receives caller information entered as user input by the user, the caller information conveyed in the incoming voice segments.

7. The system of claim 1, wherein the interface further comprises a reference area that stores reference information accessible by the user to answer a question conveyed in the incoming voice segments.

8. The system of claim 7, wherein the reference information comprises textual information and video information arranged as graphical elements.

9. The system of claim 1, wherein the processor determines the performance of the user by generating at least three separate scores, each score measuring the performance of the user in a particular category.

10. The system of claim 1, wherein the user comprises a call center agent applicant.

11. The system of claim 1, wherein the prerecorded incoming voice segments comprise:

at least one segment conveying caller information; and at least one segment conveying a reason for the call.

12. A method for determining the performance of a user responding to a call, comprising:

audibly communicating a plurality of prerecorded incoming voice segments that simulate an incoming call to a user;

receiving user input as the user responds to the incoming voice segments; and determining the performance of the user based on the user input.

13. The method of claim 12, further comprising:

presenting a plurality of potential user responses associated with the incoming voice segments; and receiving user input specifying one of the responses.

14. The method of claim 12, further comprising:

receiving user input specifying a selected one of a plurality of responses associated with each incoming voice segment; and determining the performance of the user based on whether the selected response is the most appropriate.

15. The method of claim 12, further comprising:

storing a plurality of prerecorded outgoing voice segments associated with each incoming voice segment; and audibly communicating the outgoing voice segments to the user.

16. The method of claim 12, further comprising:

associating a plurality of potential user responses for a first incoming voice segment to a plurality of second incoming voice segments, each response associated with a corresponding second incoming voice segment;

receiving user input specifying a selected response; and selecting the second incoming voice segment associated with the selected response.

17. The method of claim 12, further comprising receiving caller information entered as user input by the user, the caller information conveyed in the incoming voice segments.

18. The method of claim 12, further comprising storing reference information accessible by the user to answer a question conveyed in the incoming voice segments.

19. The method of claim 18, wherein the reference information comprises textual information and video information arranged as graphical elements.

20. The method of claim 12, further comprising determining the performance of the user by generating at least three separate scores, each score measuring the performance of the user in a particular category.

21. The method of claim 12, wherein the user comprises a call center agent applicant.

22. The method of claim 12, wherein the prerecorded incoming voice segments comprise:

at least one segment conveying caller information; and at least one segment conveying a reason for the call.

23. A computer for determining the performance of a user responding to a call, comprising:

a memory operable to store a portion of an incoming call as a first prerecorded incoming voice segment, a plurality of responses associated with the first incoming voice segment, and a plurality of second prerecorded incoming voice segments, each second prerecorded incoming voice segment associated with a corresponding response;

an interface operable to communicate the first incoming voice segment to the user, the interface further operable to receive user input specifying a selected response as the user responds to the first incoming voice segment; and a processor coupled to the memory and the interface, the processor operable to select the second incoming voice segment associated with the selected response for communication to the user, the processor further operable to determine the performance of the user based on whether the selected response is the most appropriate.

24. The computer of claim 23, wherein the memory stores a prerecorded outgoing voice segment that audibly conveys each response, the interface further operable to communicate the outgoing voice segment to the user.

25. The computer of claim 23, wherein the interface receives caller information entered as user input by the user, the caller information conveyed in the incoming voice segments.

26. The computer of claim 23, wherein the interface further comprises a reference area that stores reference information accessible by the user to answer a question conveyed in the incoming voice segments.

27. The computer of claim 26, wherein the reference information comprises textual information and video information arranged as graphical elements.

28. The computer of claim 23, wherein the processor determines the performance of the user by generating at least three separate scores, each score measuring the performance of the user in a particular category.

29. The computer of claim 23, wherein the prerecorded incoming voice segments comprise:

at least one segment conveying caller information; and at least one segment conveying a reason for the call.

30. The computer of claim 23, wherein the interface comprises a button that when activated indicates the user is prepared to receive another call.

31. The computer of claim 23, wherein the user comprises a call center agent applicant.

* * * * *